(No Model.) 3 Sheets—Sheet 3.
J. VAN RUYMBEKE.
EVAPORATOR.
No. 550,699. Patented Dec. 3, 1895.
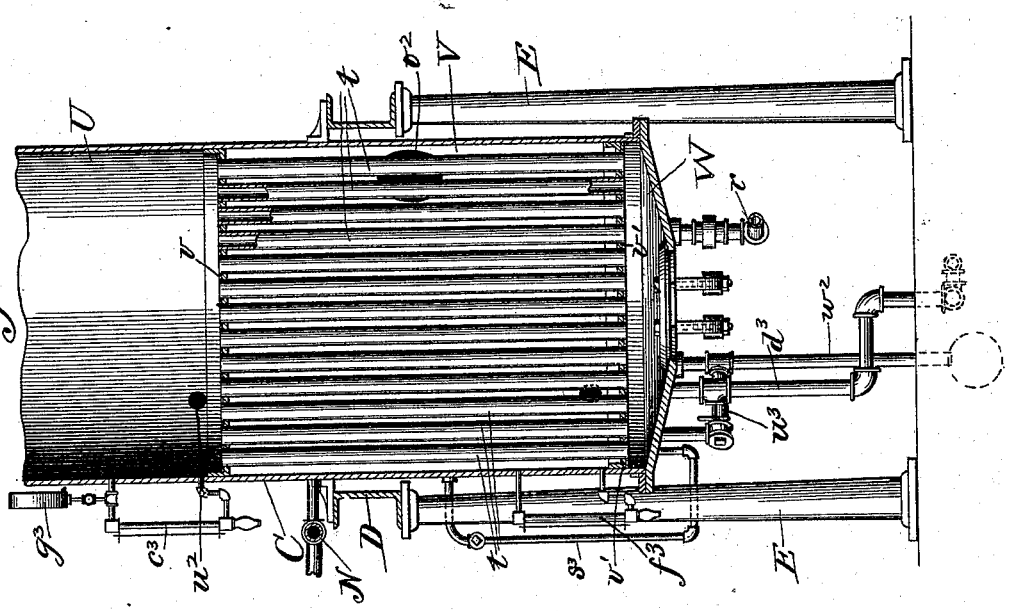
Witnesses
W. C. Corliss
A. M. Best
Inventor
Joseph Van Ruymbeke
By Cobun & Thacher
Atty.

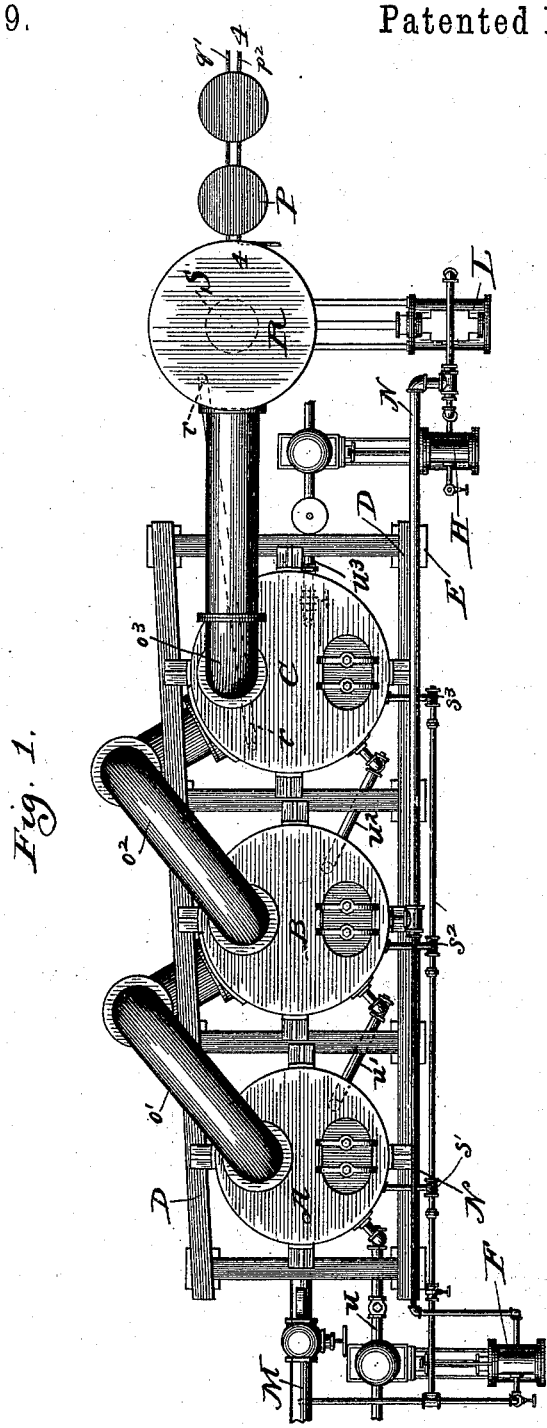

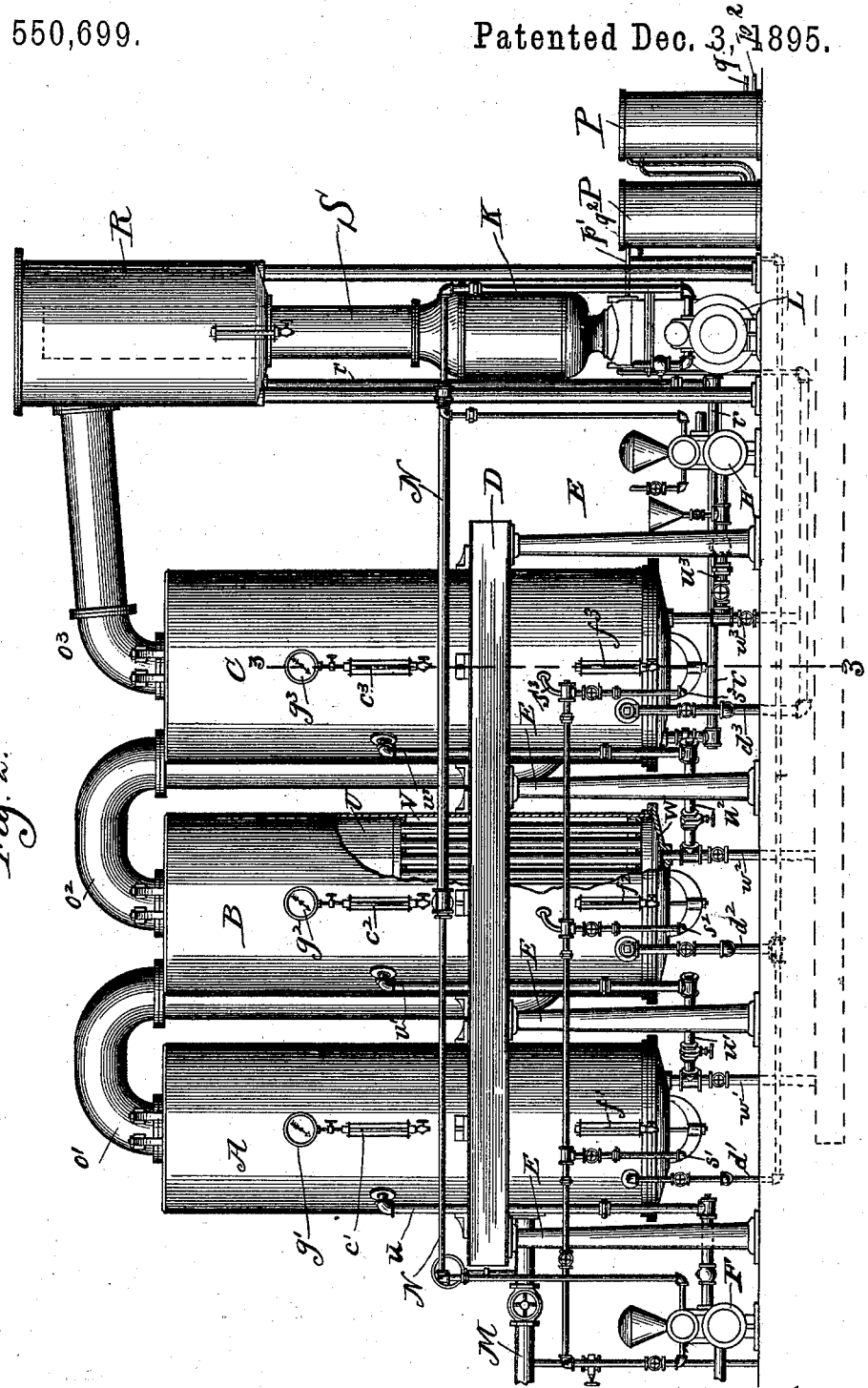

UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

EVAPORATOR.

SPECIFICATION forming part of Letters Patent No. 550,699, dated December 3, 1895.

Application filed December 22, 1890. Serial No. 375,458. (No model.)

*To all whom it may concern:*

Be it known that I, JOSEPH VAN RUYMBEKE, a subject of the King of Belgium, residing at Chicago, in the county of Cook and State of Illinois, have invented a certain new and useful Improvement in Evaporators, which is fully set forth in the following specification, reference being had to the accompanying drawings, in which—

Figure 1 is a plan of the top. Fig. 2 is a front elevation, a part of the second pan being broken away. Fig. 3 is a section of the third pan, seen from the right hand, Fig. 2.

My invention relates to improvements in evaporators, the points of novelty of which are specifically set forth in the claim.

In the drawings I have represented an apparatus which embodies my invention and in which three evaporating-pans A, B, and C are employed. These pans are preferably cylindrical in shape and are supported within a frame D by means of pillars or posts E. Said pans are preferably of gradually-increasing size, whereby a larger amount of liquid may be subjected to heat in the last pan; but this is not necessary. A manhole is formed in the top and bottom of each pan, by means of which the interiors thereof may be reached for cleaning the same. Within each pan (see Fig. 3) are two heads or flue-sheets $v$ and $v'$, which are connected by flues $t\,t$, whereby a heating-drum V will be formed. Beneath this drum is a chamber W for receiving sediment or concentrated liquid, the bottom of the pan being concaved for this purpose, and above the said drum is a chamber U, of sufficient size to allow for foaming of the liquid.

The heating-drum V of the pan A is supplied with live steam through a pipe M, and the heating-drum of the middle pan B is supplied, preferably, with exhaust-steam through a pipe N. This exhaust-steam may be obtained from the several pumps which are to be used with the apparatus, as will be explained, or from the operating-engine, if one be used.

The heating-drum of the pan C is not supplied with steam, but is heated entirely by hot vapors from the pan B, although this is not necessary.

A large vapor-pipe $o'$ connects the top of the first pan A with the heating-drum of the second pan B, and a similar vapor-pipe $o^2$ connects the top of the second pan B with the heating-drum of the third pan C. The pan C is connected with a catch-all R by means of a vapor-pipe $o^3$. Said catch-all R consists of a cylindrical casing supported on pillars or posts and with a pipe S, open at its upper end, extending up within said casing above the mouth of the vapor-pipe $o^3$. The pipe S communicates with a condenser K, and a vacuum-pump L is connected with said condenser for maintaining the desired degree of vacuum in said condenser, catch-all, and the various evaporating-pans.

Liquid is supplied to the first pan A at a point immediately above the heating-drum therein through a pipe $u$ by means of a pump F. The lower end of the pan A is connected with the pan B by a pipe $u'$, which leads into said pan B immediately above the heating-drum therein, and said pan B is connected in the same way to the pan C by a pipe $u^2$. The lower end of the pan C connects with a pump H by a pipe $u^3$, and said pump forces the evaporated liquid to a receiving-tank, if of value, or to the sewer or elsewhere, if worthless. The pipes $u'$, $u^2$, and $u^3$ connect with the sewer by means of valved pipes $w'$, $w^2$, and $w^3$, normally closed, and which may be opened when it is desired to flush or clean the apparatus with steam or water. Suitable pipes $s'$, $s^2$, and $s^3$ are employed for admitting steam or water for this purpose, said pipes leading into the various pans beneath the heating-drums thereof.

The heating-drum of the pan A is provided with a valved drip-pipe $d'$ for carrying off the water of condensation from the live steam therein, the heating-drum of the pan B with a valved pipe $d^2$ for carrying off the condensed exhaust-steam and vapors therein, and the heating-drum of the pan C with a valved pipe $d^3$ for carrying off the condensed vapors therein. Normally all of the valves in these pipes are closed and are only opened when a considerable quantity of condensable vapors have accumulated in the several heating-drums. The amount of liquid in said heating-drums will be indicated by water columns $f'$, $f^2$, and $f^3$. Other water columns $c'$, $c^2$, and $c^3$ are employed for indicating the height of the liquid on the respective pans, and vacuum-gages $g'$, $g^2$, and $g^3$ indicate the degree of vacuum therein.

In employing my improved apparatus for the evaporation of brine, for example, I proceed as follows: The pumps F, H, and L are operated, and exhaust-steam from said pumps is supplied to the heating-drum of the pan B by the pipe N. Live steam is supplied to the heating-drum of the pan A by the pipe M. The weak brine is now pumped by the pump F through the pipe $u$ into the pan A, and the supply thereto is so regulated as to keep the height of the liquid at or slightly above the upper end of the heating-drum thereof. This liquid will fill the tubes $t$ of said drums and the lower part of the pan and will be subjected to the heating effects of the live steam by said tubes and the two heads or ends of the heating-drum. The proper degree of heat being maintained, the liquid will be evaporated and the hot vapors will pass through the vapor-pipe $o'$ and will enter the heating-drum of the pan B, where, in conjunction with the exhaust-steam therein, the said vapors will heat the liquid in the said pan B. The liquid in the lower part or chamber W of the pan A, which liquid will be partly evaporated, will flow through the pipe $u'$ and will enter the pan B, so as to fill the same to about the top of the heating-drum therein. The liquid thus flows from the pan A to the pan B by reason of the partial vacuum created in the latter by the vacuum-pump L. The partially-evaporated liquid in the pan B, being heated by the heating-drum therein, will be evaporated and the vapors therefrom will pass through the vapor-pipe $o^2$ into the heating-drum of the pan C, where they serve to evaporate the liquid therein. This liquid is supplied to the pan C from the pan B through the pipe $u^2$ by reason of the vacuum in the pan C, and the liquid thus drawn from the lower portion of the pan B will have been twice evaporated. In the pan C the liquid is subjected to a third and final evaporation, although it is of course evident that any desired number of evaporating-pans may be employed, whereby the liquid may be subjected to any desired number of evaporating operations. From the evaporating-pan C the vapors are conveyed to the catch-all R, where said vapors impinge against the upper portion of the pipe S, and any moisture carried by said vapors or mechanically entrained therewith will be condensed and collected in the catch-all and be removed, when desired, by a pipe $r$ and returned to the pan C.

The evaporated liquid from the lower portion of the pan C may be pumped from the same by the pump H and is ready for use or for other and final operations to which this invention has no relation.

Having now described my invention, what I claim, and desire to secure by Letters Patent, is—

An improved evaporating apparatus, comprising in combination, two or more evaporating pans; flue sheets $v$, $v'$, within each pan, and tubes $t$ connecting said flue sheets, whereby a heating drum is formed; a chamber W beneath said heating drum for receiving the evaporated liquid; a chamber U in said heating drum connected by means of an eduction pipe with the heating drum of the adjacent pan; a pipe $u$ leading into the first pan above the heating drum therein; a pump F for maintaining a supply of liquid to the first pan; pipes connecting the chamber W of each pan with the adjacent pan above the heating drum of said adjacent pan; drain pipes $w'$, $w^2$, connecting the latter pipes with the sewer; live steam pipes $s'$, $s^2$, $s^3$, for supplying live steam to the interior of the pans for flushing the same; a live steam pipe M for supplying steam to the heating drum of the first pan; a catch-all R connected with the last pan; a condenser K connected with said catch-all; a vacuum pump L connected with said condenser for maintaining a vacuum in the apparatus; a pump H connected with the last pan for removing the evaporated liquid therefrom; and a pipe N connected with the heating drum of one or more of the intermediate pans, and supplied with exhaust steam from the pumps F, H and L, substantially as set forth.

JOSEPH VAN RUYMBEKE.

Witnesses:
ALOYSIA HELMICH,
A. M. BEST.